Jan. 19, 1932.  C. R. NICHOLS ET AL  1,842,361
ELECTRICAL PROSPECTING
Filed Nov. 9, 1926  2 Sheets-Sheet 1
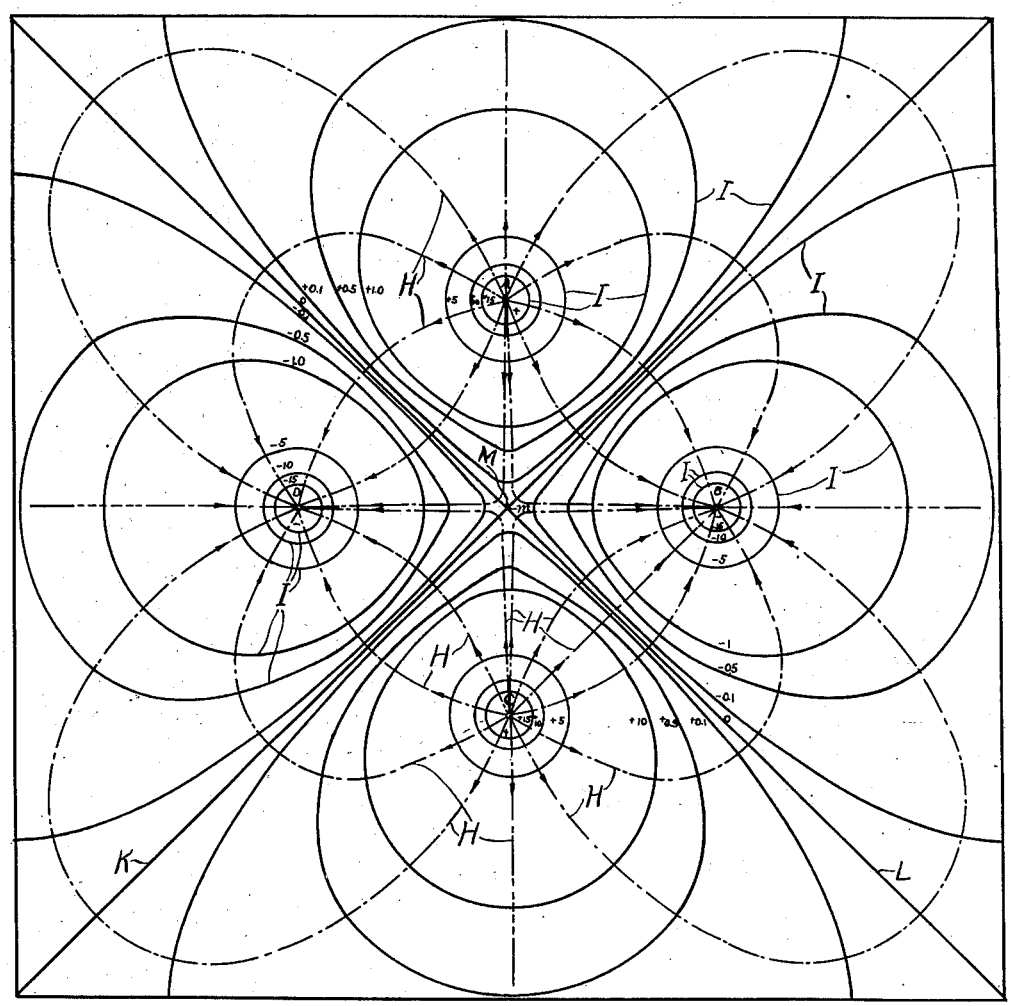
Fig. 1,
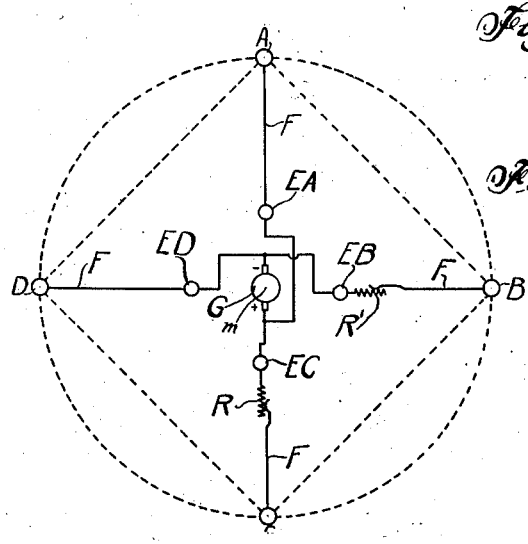
Fig. 2,
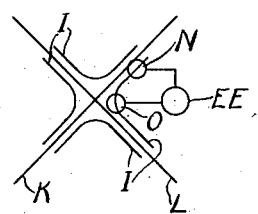
Fig. 3,
INVENTORS
CHARLES R. NICHOLS
and SAMUEL H. WILLISTON
BY
John E. Hubbell
ATTORNEY INVENTORS
CHARLES R. NICHOLS
AND SAMUEL H. WILLISTON
BY
John E. Hubbell
ATTORNEY Patented Jan. 19, 1932

1,842,361

UNITED STATES PATENT OFFICE

CHARLES R. NICHOLS, OF NEW YORK, N. Y., AND SAMUEL H. WILLISTON, OF NEW HAVEN, CONNECTICUT

ELECTRICAL PROSPECTING

Application filed November 9, 1926. Serial No. 147,310.

The general object of the present invention is to provide improved methods for determining the location and character of subsurface bodies or earth portions of different electrical resistance from the adjacent earth portions. Our present invention was primarily devised for use in locating deposits of petroleum but the invention is well adapted also, to the location of ore deposits of higher conductivity than the adjacent earth portions. In extended experimentation, and in the practical use of our invention in various oil fields in this country, we have found that natural subsurface bodies of oil sands invariably produce potential center displacement effects of the character which would be produced if the specific resistance of those bodies were substantially lower than that of the adjacent earth. We recognize the possibility that such displacements may be due to saline matter associated with the oil sands and not to the direct action of the latter, but are not certain that this is the case.

In carrying out our present invention we energize an observation field by causing an electric current flow through the earth between a plurality of energization points in the said field so related and so energized as to create two or more iso-potential lines on the earth's surface which intersect at a point which we call the potential center of the observation field. Preferably the energized points are so disposed as to outline a geometrical figure having a geographical center and are so energized that said geographical center coincides with the potential center of the field of observation when the portion of the subjacent earth in which significant potential differences are created by the energization of said field is of uniform conductivity. When said earth portion includes a body of different conductivity from the remainder of said earth portion, however, the potential center is displaced from the geographical center of the field unless the center of said body happens to lie under the geographic center, to an extent and in a direction which affords some indication of the character and location of said body.

Various dispositions of the energized points in the field of observation may be employed. For instance there may be four energized points located at the corners of a square, with the two points at the ends of one diagonal of opposite polarity to the two points at the end of the other diagonal. To faciliate the necessary manipulation of the energizing conductors it is practically advisable in many cases to locate the energization points at the corners of a rectangle, two sides of which may be a couple of miles or so in length, while the other two sides are only a few hundred yards long. With four points arranged and energized as described, there are two intersecting iso-potential lines, but the energizing points may be of such number, and so disposed as to create more than two iso-potential lines all intersecting at the same point. This result is secured for instance, if there are three or more pairs of energization points and the latter are spaced at equal distances apart about a circle, with each two adjacent points in the circle of opposing polarity.

In general we consider it desirable in order that disturbing induction may be avoided, to energize the observation field by means of a direct current generator, but the energization may also be effected from a source of alternating current, in which case the potential center may be located by means of a detecting circuit including an antenna, or antennæ, and amplifying means such as are employed in radio receiving circuits.

In general, to cover any extended field of exploration, it is necessary to successively establish a plurality of different observation fields each covering a different portion of the exploration field, and to determine the character of the earth structure below the exploration field from the information collectively furnished by the observations made in connection with the different observation fields.

Regardless of the manner of energizing the observation field and locating its potential center, the invention possesses a marked advantage over previous methods of electrical prospecting because the potential center of the observation field which we create may be located with appreciably less effort than is required to locate the elongated iso-potential lines which it is necessary to locate with methods heretofore proposed.

The potential center displacement method of electrical prospecting permits of the rapid, systemmatic and relatively inexpensive exploration of an extended field of exploration, and is characterized by the ease and comparative accuracy with which the observation results obtained may be coordinated, compared and interpreted. With the present invention the observational data obtained is always direct and positive, in that the direction of potential center displacements is a precise indication of the relative locations of the geographical center of each observation field and the disturbing body. The results obtained are thus more direct and positive than those obtained with methods of electrical prospecting heretofore proposed in which the effect of a disturbing body on the form of elongated iso-potential lines is determined. The form of such lines, may be very different with different relative locations of the disturbing body and the energization points or lines of the observation field. Furthermore, with the methods heretofore proposed for tracing out iso-potential lines it is impossible to identify the potential line traced out either as to its actual potential or as to the extent of the displacement, if any, of the portion of the line traced out, from the position which such line portion would occupy if the subjacent earth were of uniform conductivity.

The simplicity of our method and the positiveness of the results obtained greatly increases the ease and accuracy obtainable in making determinations of the depths of disturbing bodies. The extent of potential center displacement depends among other things upon the relationship between the depth of the mass and the distances between the geographic center and energization points of an observation field energized in accordance with the present invention.

The various features of novelty which characterize our invention are pointed out with particularity in the claims annexed to and forming a part of this specification. For a better understanding of our invention, however, its advantages and specific objects attained with its use, reference should be had to the accompanying drawings and descriptive matter in which we have illustrated and described preferred embodiments of our invention.

Of the drawings:

Fig. 1 is a chart diagrammatically illustrating current flow distribution and potential variations at the surface of an observation field under certain conditions;

Fig. 2 is a diagrammatic representation of an observation field energization system;

Fig. 3 is a diagrammatic representation of means for determining potential differences between points on the earth's surface;

Figures 8, 8A:
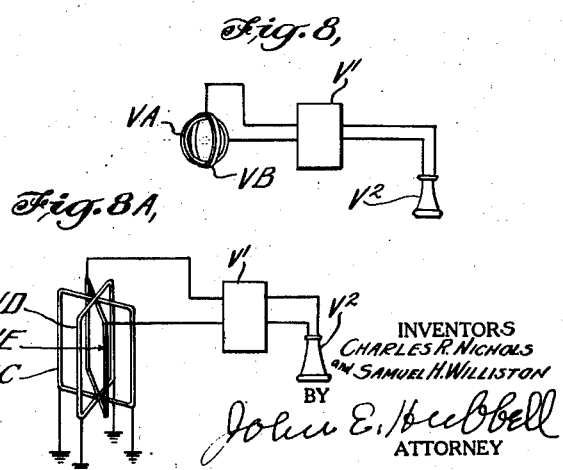

Figs. 8 and 8A each illustrate a different arrangement for locating the potential center of an observation field energized by alternating current.

In the observation field energizing system diagrammatically illustrated in Fig. 2, the energization points A, B, C and D are located at the corners of a square, the diagonally opposed points A and C being connected by corresponding conductors F to the positive side of a direct current generator G, while the other two energization points D and B are connected by corresponding conductors F to the negative side of the generator. Variable resistances R and R' in the conductors F running to two energization points, B and C as shown of opposite polarity form means for securing the same current flow into or out of the earth at each energization point. EA, EB, EC and ED are ammeters in the different conductors F, the readings of which indicate when and how the resistances R' and R² need to be adjusted to obtain and maintain the desired uniformity of energization.

Contact between the corresponding conductor F and the earth at each of the energization points A, B, C and D may be affected in any usual or suitable manner. Ordinarily this contact is effected by inserting a plurality of metallic pegs or electrodes in the earth distributed over an area of 10 to 100 feet or so in diameter, the center of which may be assumed to be the energization point mathematically considered. Especially as the area in which the electrode pegs are inserted is very small in comparison with the distances between the energization points which in practice may well vary from a minimum of 400 or 500 yards, up to 2 or 3 or more miles. To insure good contact, and to avoid polarization difficulties, the ground in the vicinity of each electrode peg may be wetted with a solution of a salt of the metal forming the peg, for instance, a solution of copper sulphate when the pegs are made of brass, or may be wetted by a solution of any other salt adapted to serve as an electrolyte, or the earth may simply be wetted with water in many cases.

Fig. 1 is a chart illustrating the direction of current flow and potential variations at the surface of the earth forming an observation field energized as shown in Fig. 2 when the portion of the earth near enough to the observation field to significantly effect the flow distribution and potential variations at the surface of the field of observation, is of uniform conductivity. In such case there will be an iso-potential line K passing between energization points D and C, and midway between the energization points A and B, and also a mid-potential line L midway between the points A and D, and midway between the points B and C. These lines are perpendicular to one another, and intersect at the potential center point M, which in this case is coincident with the geographic center *m* of the field of observation.

Figure 4:
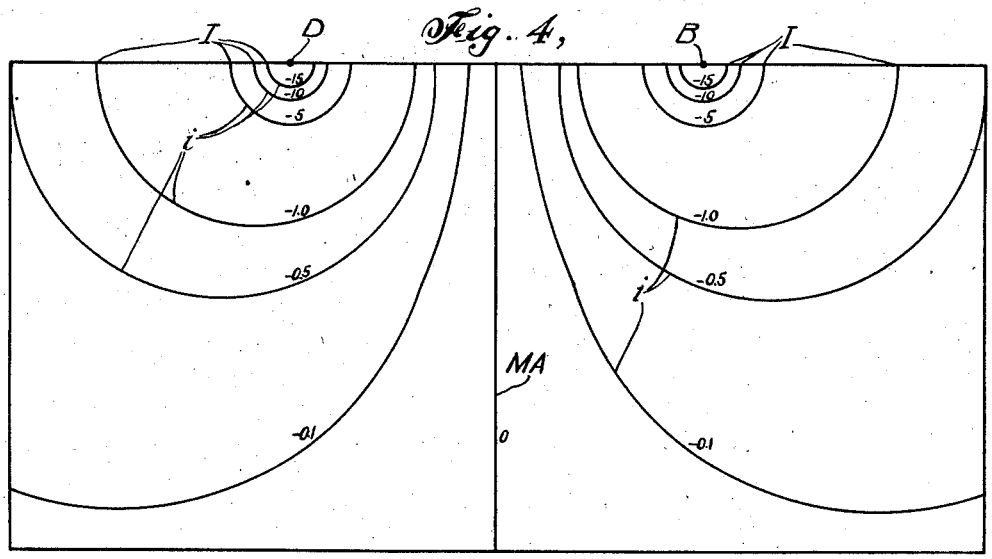
Fig. 4 is a diagram illustrating potential variations in a vertical plane including the lines from the points D, B, of Fig. 1.

We use the term "iso-potential" herein to designate a line like the lines K and L in that all points along the line are at the same potential. Such a line may also be called an equipotential line. The iso-potential lines K and L may also be called zero potential lines, since no change in potential at points along those lines is created by the artificial energization current flow through the earth between the energization points. In addition to the zero potential lines K and L any number of other iso-potential lines may be traced on the field of observation. Some of these other iso-potential lines are shown in Fig. 1, and are designated by the symbol I. It is one of the practical advantages of the invention, however, that with the described method of energization the zero potential lines are the only iso-potential lines which intersect. The iso-potential lines are closed curves. If the earth were of uniform conductivity, the lines L and K would theoretically be great circles, and each other iso-potential line I would lie in one or any of the quadrants formed by the intersection of the planes including the great circles K and L. In practice, of course, the distance from an observation field at which measurable potential differences are created by the energization of the corresponding points A, B, C and D in ordinary electrical prospecting work is nothing like as great as the half circumference of the earth. The relative magnitude of the potential variations between different iso-potential lines are indicated in Figs. 1 and 4, by numbers 0.1, 0.5, 1.0, 5, 10 or 15, etc., with a plus or minus sign in front of each number, and applied to the various iso-potential lines or surfaces shown in those figures. The direction of current flow at the earth surface or in the earth at any point is normal to the iso-potential line or surface at that point. In Fig. 1, the lines H indicate the manner in which the direction of current flow varies over the observation field.

In Fig. 4 the lines *i* are iso-potential lines in the vertical plane including the points D and B of Figs. 1 and 2. The lines *i* represent the intersection in a said vertical plane of concave iso-potential surfaces which intersect the surface of the earth along the iso-potential lines I. In Fig. 4 MA is a line representing the intersection of the diametral planes including the zero potential lines K and L.

In locating the potential center M of an observation field energized in accordance with the present invention, the general method of procedure is to shift exploring contacts O and N over the observation field in the neighborhood of the geographic center *m* of the latter or in the neighborhood of the expected position of the potential center M, until a galvanometer or other detecting instrument EE connected to the exploring contacts shows the latter to be at the same potential when either is moved along a line intersecting a line on which the other exploring control is located. This condition can only exist when those lines are such zero potential lines as the lines K and L of Fig. 1. In general the detecting circuit including the contacts O and N and instrument E may be identical with arrangements heretofore proposed for locating points on iso-potential lines. In practice the detecting circuit illustrated in Fig. 3 may well include such amplifying provisions and provisions for eliminating the effect of stray earth currents which are disclosed and claimed in our prior application Serial No. 129,430, filed August 16, 1926, and in practice also, the energization currents supplied by the generator G may advantageously be interrupted and reversed at regular intervals as described in said prior application. The features of our invention disclosed in our prior application and referred to above need not be described in detail herein, however, as they form no part of the present invention, and while they may advantageously be used in carrying out the present invention, the latter may be carried out in other ways and by other instrumentalities.

It is hardly necessary to explain, moreover, that with a disturbing body influencing the current distribution in such a field of observation as is shown in Figs. 1 and 2, and having its geographical center *m* located at one side of either or both of the lines K and L, that those lines would not be straight lines. Whatever the form of the disturbing body or of the geological fault displacing the potential center of a field of observation energized in the manner indicated in Figs. 1 and 2, may be, however, the magnitude and the direction of each potential center displacement produced, may be determined with comparative ease.

Furthermore, the extent and direction of the different potential centers from suitably located geographic centers of observation fields obtained with the use of our inventions provide data from which the form and character of the disturbing body or fault can be interpreted with more ease and greater accuracy than is possible with the observation data obtained with electrical prospecting methods heretofore proposed.

It will be understood, of course, that in interpreting potential center displacement data obtained with the use of the present invention proper regard should be given not only to the variations thereby indicated from the theoretically determinable current distribution in an exploration field above a portion of the earth of homogeneous conductivity, as shown in Fig. 1, but also to certain empirical rules developed as a result of previous experience in electrical prospecting methods, and resulting from knowledge concerning the general character of the earth structure beneath the exploration field previously acquired as by electrical prospecting methods, torsion balance density determinations, drilling operations or other geophysical or geological investigations.

Figures 5, 5A:
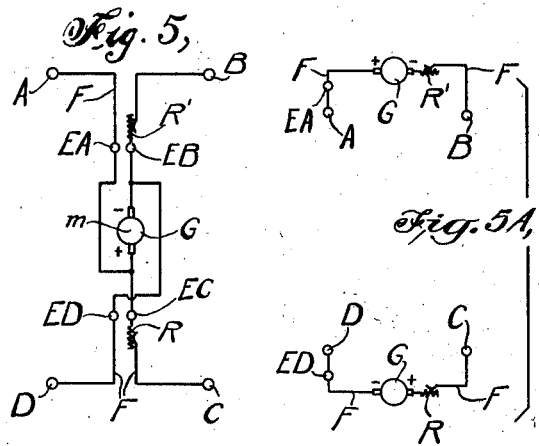
Figs. 5 and 6 are diagrams each illustrating a different modification of the energization point arrangement shown in Figs. 1 and 2.

As previously indicated there is an especial advantage in some cases in locating the energization points A, B, C and D at the corners of a rectangle which, as shown in Fig. 5, has two of its sides much longer than the other sides. With the energization point location in Fig. 5 the conductor leads F may, for the most part, run along a single line which may be followed by a truck or the like employed to pay out and reel up the conductors, the conductors extending laterally from this line adjacent its ends to the different energization points.

Figure 6:
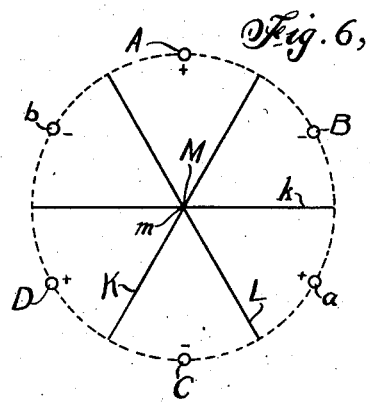

In Fig. 6 we illustrate an arrangement in which six energization points A, B, C, and D, and $a$, $b$ are equally spaced about the center $m$ of the observation field. In this case there will be three zero-potential lines K, L and $k$ all of which will intersect at a potential center point M which will coincide with, or be displaced from the geographical center $m$ according to the character of the underlying earth.

Figure 7:
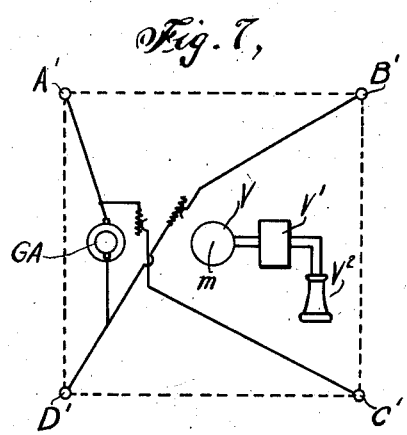
Fig. 7 is a diagrammatic representation of an alternating current system of energizing an observation field and means for locating the potential center thereof.

While from the standpoint of induction difficulties direct current energization of the field of observation is preferable to alternating current energization, it is possible in some cases to properly energize an observation field from a source of alternating current such as the alternator GA shown in Fig. 7. When the observation field is energized with alternating current in the general manner shown in Fig. 7, the potential center locating means may comprise a horizontal antenna loop V connected to a telephone receiver $V^2$ by amplifying means V' such as are employed in radio receiving circuits of known type. The looped antenna V may comprise coils of a yard or so in diameter which may surround the body of and be carried by an observer provided with a head phone $V^2$, and carrying the amplifying means V' connecting the head phone to the looped antenna, so that the observer may locate the potential center by moving about until he locates the lines which intersect at the potential center M of the observation field, where the sounds heard through the phone $V^2$ in other locations of the antenna cease or are greatly diminished. In lieu of a detector circuit comprising a single horizontal looped antenna V, the detector circuit may comprise two vertically disposed looped antennæ VA and VB held at right angles to one another as shown in Fig. 8.

In another arrangement illustrated in Fig. 8A, we employ two vertically disposed antenna loops VC and VD each grounded at each end, and a third vertically disposed loop VE having its terminals connected to the receiving and amplifying apparatus. The three loops are coaxial in the sense that a line centrally disposed with respect to the two vertical sides of each loop is coincident or approximately coincident with the corresponding central line of each of the other two loops. The loops VC and VD are arranged at right angles with one another and the loop VE is adjustable about the common axis of the three loops. With this arrangement the loops VC and VD pick up energy which is imparted to the loop VE by induction. The arrangement shown in Fig. 8A is especially effective in eliminating the effects of stray earth currents under certain conditions, and in facilitating the detection and amplification of electrical impulses due to small minute potential differences. The method of energizing an exploration field disclosed herein, whereby equi-potential lines which intersect at a potential center point are produced, while broadly novel with us, is not claimed herein, but is claimed generically and specifically in our copending applications Serial No. 303,542, filed September 1st, 1928, and Serial No. 206,829, filed July 19th, 1927, respectively, wherein we disclose the same method of field energization herein disclosed and also disclose alternative methods of field energization producing equipotential lines which intersect to define potential center points.

While in accordance with the provisions of the statutes we have illustrated and described the best form of our invention now known to us, it will be apparent to those skilled in the art that changes may be made in the form of the apparatus disclosed without departing from the spirit of our invention as set forth in the appended claims, and that certain features of our invention may sometimes be used to advantage without a corresponding use of other features.

Having now described our invention, what we claim as new and desire to secure by Letters Patent is:

In the electrical determination of the subsurface composition of the earth, the method which consists in energizing distributed points in a field of observation by means of a source of alternating current so as to create iso-potential lines which intersect at a point, and locating said point by means of a detector circuit including an antenna movable over the exploration field.

Signed by CHARLES R. NICHOLS, at Dallas, in the county of Dallas and State of Texas, this 16th day of October, A. D. 1926.

CHARLES R. NICHOLS.

Signed by SAMUEL H. WILLISTON, at Dallas, in the county of Dallas and State of Texas, this 16th day of October, A. D. 1926.

SAMUEL H. WILLISTON.